Oct. 20, 1964  E. RUDDER  3,153,541

GASKET ASSEMBLY

Filed July 13, 1962

Elbert Rudder,
INVENTOR.

BY S. J. Rotondi
A. T. Dupont
Jack W. Voigt

3,153,541
GASKET ASSEMBLY
Elbert Rudder, Madison, Ala., assignor to the United States of America as represented by the Secretary of the Army
Filed July 13, 1962, Ser. No. 209,805
5 Claims. (Cl. 277—180)
(Granted under Title 35, U.S. Code (1952), sec. 266)

The invention described herein may be manufactured and used by or for the Government for governmental purposes without the payment of any roylaty thereon.

This invention relates to an improved gasket assembly and more particularly to a gasket assembly for use in fluid systems having high temperature and pressure ranges.

Previous gasket designs, employed, have proven unsuitable in cases where extreme temperature and pressure changes take place in the fluid flow past the gaskets. The sandwich type gasket for example has the disadvantage of requiring the application of a large connecting force to keep the gasket sealed in its proper position due to the relatively large area over which this force is distributed. Other types of gaskets, though needing only a small connecting force, tend to flow laterally or move from their seat when subjected to high differential pressures. Other gasket designs do not readily compensate for differences in the coefficient of expansion of gasket and adjacent surfaces.

It is therefore an object of this invention to provide a gasket design which would be effective in high temperature and pressure flow systems while requiring only low connecting force to effect a seal.

Another object is to provide a gasket design which would prevent the flow or lateral movement of the seal when the gasket is subjected to high pressure differentials.

Still another object of this invention is to provide a gasket which when in use between adjacent surfaces would prevent the breaking of the seal due to the gasket and adjacent surfaces having different physical properties and therefore different coefficients of expansion.

The foregoing objects will become more apparent upon consideration of the following detailed description and the accompanying drawings in which.

Figure 1:
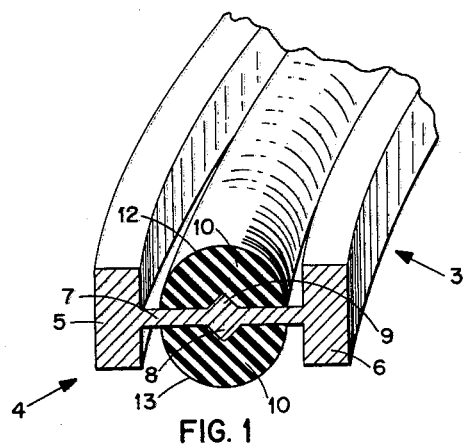
FIGURE 1 is a perspective view, in cross section, of the gasket.
Figure 2:
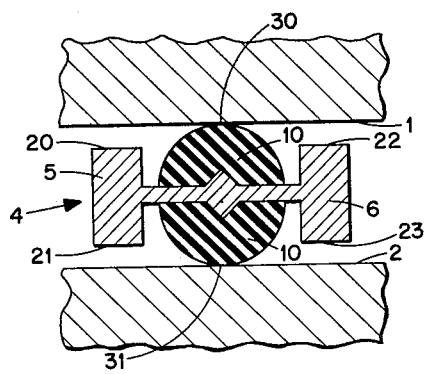
FIGURE 2 is a cross sectional view of the gasket as seen between two adjacent surfaces before a connective load is applied.

Referring to the drawings, FIGURE 1 shows the gasket 3 to include a one-piece metallic, generally H-shaped core 4, and a bipartite generally convex resilient seal 10.

The core 4 has two vertical members 5 and 6 and a cross strut 7 extending between and secured to the vertical members 5 and 6. Formed integrally with the cross strut 7 are nodules 8 and 9 extending respectively above and below the cross strut.

The bipartite generally convex seal 10 is bonded to the core 4 in any suitable manner above and below cross strut 7 so as to permit the exposure of the convex surfaces 12 and 13.

Figure 3:
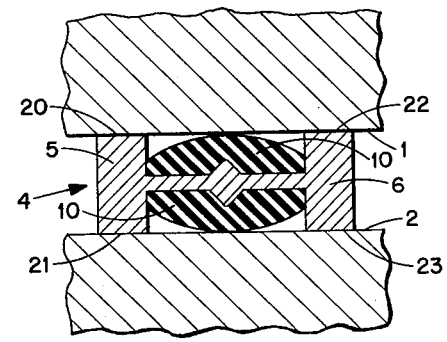
FIGURE 3 represents the same cross section as FIGURE 1, after a connecting load has been applied.

As shown in FIGURE 3, the core 4 contacts the adjacent surfaces 1 and 2, of the members to be sealed, at surfaces 20, 21, 22, and 23. The core is preferably made of the same material as that of the adjacent surfaces 1 and 2 so that the core, when in contact with the adjacent surfaces, will react to temperature chages in the same way as the adjacent surfaces. Core 4 thus provides a means for preventing the breaking of the seal due to temperature changes caused by the heating or cooling of the surfaces 1 and 2.

Vertical members 5 and 6 are disposed to prevent the seal 10 from flowing in a lateral direction when the gasket 3 is subjected to large pressure differentials caused by fluid flowing past the gasket.

Nodules 8 and 9, which contact seal 10, provide a means for preventing seal 10 from losing its generally convex shape by acting as a rigidifying support beneath the seal 10 when a connecting load is applied. The nodules also aid in the prevention of lateral deformation of the seal under conditions of high differential pressures.

Therefore, it can be seen that a means of effecting a seal of high specific pressure while using a low connecting force is accomplished by having and maintaining substantially a line contact between the adjacent surfaces 1 and 2 and the generally convex seal 10 at points 30 and 31.

Thus, it will be appreciated that this invention provides a means of effecting a seal between two adjacent surfaces that is substantially unaffected by large pressure and temperature changes, and which the seal is effected with a relatively low connecting force.

It is to be understood that various modifications of the gasket design described herein can be made without changing the spirit and scope of the embodiment as claimed.

The invention claimed is:

1. A gasket comprising: a core including a plurality of spaced members, a cross strut extending between said members, rigidifying means carried by and extending above and below said cross strut; and a seal carried by said core and in engagement with said means, whereby said members limit lateral deformation of said seal under load conditions and said rigidifying means is disposed for outward projection of said seal for maintaining substantially line contact between the seal and the members being sealed.

2. An assembly as set forth in claim 1, in which said seal is carried on said cross strut and extends over said means and lies between said members leaving at least one surface of said seal exposed.

3. An assembly as set forth in claim 2, in which said exposed surface of said seal is generally convex.

4. An assembly as set forth in claim 2, in which said means comprises nodules extending above and below said cross strut for maintaining said surface generally convex under conditions of load.

5. A gasket lying between adjacent surfaces comprising: a core, said core being of the same material as that of the adjacent surfaces so as to react identically with said adjacent surfaces to any temperature environment, said core including a plurality of spaced members, a cross strut extending between said members, rigidfying means carried by and extending above and below said cross strut; and a seal carried by said core and in engagement with said rigidifying means, said means disposed to maintain said seal generally convex for substantially line contact between said seal and said surfaces and to prevent lateral deformation of said seal under load conditions.

References Cited in the file of this patent
UNITED STATES PATENTS
2,513,178    Jackson _____ June 27, 1950
3,033,582    Creavey _____ May 8, 1962